United States Patent [19]

Fehr et al.

[11] Patent Number: 4,561,898

[45] Date of Patent: Dec. 31, 1985

[54] HARDENER FOR SILICATE SOIL STABILIZERS

[75] Inventors: Hans Fehr, Duesseldorf; Wolfgang Pesch, Grevenbroich; Wolfgang Friedemann, Neuss, all of Fed. Rep. of Germany

[73] Assignee: Henkel Kommanditgesellschaft auf Aktien, Duesseldorf, Fed. Rep. of Germany

[21] Appl. No.: 652,793

[22] Filed: Sep. 20, 1984

[30] Foreign Application Priority Data

Sep. 30, 1983 [DE] Fed. Rep. of Germany ....... 3335489

[51] Int. Cl.$^4$ ................................................ C09J 1/02
[52] U.S. Cl. ........................................ 106/74; 106/84; 106/314; 106/900
[58] Field of Search ................... 106/74, 84, 900, 314

[56] References Cited

U.S. PATENT DOCUMENTS

| | | | |
|---|---|---|---|
| 3,850,650 | 11/1974 | Von Bonin et al. | 106/75 |
| 3,864,137 | 2/1975 | Van Bonin et al. | 106/75 |
| 4,226,556 | 10/1980 | Kayahara | 106/74 |
| 4,293,340 | 10/1981 | Metz | 106/74 |
| 4,416,694 | 11/1983 | Stevenson et al. | 106/84 |

FOREIGN PATENT DOCUMENTS

| | | | |
|---|---|---|---|
| 2164957 | 7/1973 | Fed. Rep. of Germany . | |
| 2165912 | 7/1973 | Fed. Rep. of Germany . | |
| 56-65079 | 6/1981 | Japan | 106/74 |
| 56-72075 | 6/1981 | Japan | 106/900 |

*Primary Examiner*—William R. Dixon, Jr.
*Assistant Examiner*—Steven Capella
*Attorney, Agent, or Firm*—Ernest G. Szoke; Henry E. Millson, Jr.; Mark A. Greenfield

[57] ABSTRACT

A time-delayed hardener composition for aqueous alkali metal silicate solutions, the total formulation, and its application for soil stabilization, in which the hardener composition consists essentially 20 to 60% by weight of dimethyl carbonate and the balance to 100% by weight of diethyl carbonate.

16 Claims, No Drawings

HARDENER FOR SILICATE SOIL STABILIZERS

BACKGROUND OF THE INVENTION

1. Field of the Invention

Hardening of aqueous alkali metal silicate solutions with carbonate compositions and their use for soil stabilization.

2. Statement of the Related Art

Aqueous alkali metal silicate solutions for stabilizing soil and waterproofing the ground have long been known and are widely used in practice. Particularly in the construction of subways and other underground railways, alkali metal silicate solutions are injected into the foundation to stabilize the ground and thus to underpin already erected structures.

Thus, U.S. Pat. No. 4,293,340 and corresponding European Patent Application No. 28,495 describe a ground stabilizing composition which, in addition to aqueous alkali metal silicate solutions, contains glyoxal and hydrogen peroxide and, optionally, inorganic salts. Unfortunately, satisfactory compressive strength is not achieved by stabilizing soil with these known compositions.

The hardening of alkali metal silicate aqueous solutions containing inorganic and/or organic mixtures, with esters of organic acids partially is described in German Patent Application Nos. 21 64 957 and 21 65 912 (as well as partially corresponding U.S. Pat. Nos. 3,850,650 and 3,864,137). The hardeners used are alkyl esters of optionally halogen-, cyano- or hydroxy-substituted carboxylic acids, such as formic acid, acetic acid or propionic acid, or of dicarboxylic acids, such as oxalic acid, succinic acid or adipic acid.

However, the use of the esters mentioned above results in serious pollution of the subsoil and ground water with organic substances which are released in the course of the setting reaction. This pollution is reflected in an increase in the chemical oxygen demand (COD) value which indicates the degree of pollution of water by organic compounds. The use of compounds which greatly increase that value is unacceptable.

German Patent Application No. 21 64 957 also describes the use of dimethyl carbonate as a hardener for alkali metal silicate solutions which are used in a process for the production of foam waterglass moldings. In processes such as these, short pot lives, i.e. short periods of time in which the reaction mixture may be processed in accordance with the invention, are desirable if not actually necessary. Pot lives of 30 seconds to a maximum of 10 minutes are mentioned. A hardener resulting in a longer than 10 minute pot life is disclosed in this German application as only useful if in admixture with a short pot life hardener, so that the combination results in a pot life of 10 minutes or less. Dimethyl carbonate is disclosed as yielding a pot life of less than 10 minutes, specifically 4.5 minutes.

However, aqueous alkali metal silicate solutions which are to be used for stabilizing and waterproofing soil require pot lives of considerably longer than 10 minutes because otherwise the silicate is in danger of gelling or hardening before the solutions have been introduced into the ground through the injection lances generally used.

DESCRIPTION OF THE INVENTION

It has now surprisingly been found that mixtures of dimethyl carbonate and diethyl carbonate are eminently suitable for use as hardeners for alkali metal silicate solutions, resulting in pot lives of from at least 30 minutes up to over 1 hour.

In particular, the present invention affords hardener compositions for alkali metal silicate solutions which contain about 20 to 60% by weight, based on the total quantity of hardener, of dimethyl carbonate (carbonic acid dimethyl ester) and the balance to 100% by weight (i.e. about 40 to 80% by weight) of diethyl carbonate (carbonic acid diethyl ester). The hardener compositions are added to aqueous alkali metal silicate solutions in a quantity of about 4 to 11% by weight, based on the weight of the total formulation.

Pot lives of 30 minutes and longer are required for the use of the aqueous alkali metal silicate solutions for soil stabilization. As used herein, the term "soil" should be considered as meaning not only natural or ground soil, but also any similar solid particulate or slurry, such as mineral or industrial waste, although the use of this invention for stabilizing ground or natural soil is preferred. The pot life becomes longer with increasing proportions of diethyl carbonate. However, where the concentration of diethyl carbonate in the hardener mixture amounts to more than 80% by weight and where the hardener composition is present in the silicate formulation in a quantity of about 10%, or more, the pot life obtained is regarded as too long for most ground stabilization processes. Additions of water also lengthen the pot life, so that the formation of the initial soft gel or subsequent hard gel may be controlled by changing that parameter. The amount of water to be added will vary depending upon the amount of hardener and the desired pot life of the gel. When water is used, it is generally in a quantity of about 4 to 20% by weight, based on the total weight of the formulation.

In addition to pot life, the compressive strength of stabilized soil prepared using alkali metal silicate solutions may be correlated with the mixing ratio of the hardener compositions in accordance with this invention. The compressive strength values obtained with the hardener composition according to the invention are higher than those which can be obtained using conventional hardeners based on carboxylic acid esters, which is usually a very desirable result.

Compared with the use of conventional hardeners the use of a hardener composition according to the invention produces distinctly less pollution of the subsoil and ground water with organic constituents. This is reflected in greatly reduced chemical oxygen demand (COD) values (cf. Table 5). This favorable effect may be enhanced by the addition of at least one oxidizing agent which reacts with the alcohols formed from the hardener esters, conditioned by the alkaline saponification agent of the aqueous silicate solution.

Suitable oxidizing agents are those which can be formed into an aqueous solution. Examples of such agents are: sodium hypochlorite (13% active chlorine content); hydrogen peroxide (30 to 70% solution); and potassium perborate or percarbonate (10 to 30% solution). Sodium hypochlorite and hydrogen peroxide are preferred.

The oxidizing agent is added by simply mixing it in at the same time as the aqueous silicate solution and the hardener composition. The amount of oxidizing agent can vary within wide limits, and the weight ratio of hardener composition to oxidizing agent may be about 0.3–3:1. In the case of a salt such as sodium hypochlorite a ratio of 1.25–2.5:1 is preferred and 1:1 is most preferred. In the case of hydrogen peroxide, a ratio of 1:1–3 is preferred.

The use of hardener compositions according to the invention with aqueous alkali metal silicate solutions results initially in the formation of a soft gel and only after a certain delay in the formation of a hard gel, accompanied by the precipitation of silica. This enables alkali metal silicate solutions, which preferably have a molar ratio of $SiO_2$ to $Na_2O$ of about 4–3.4:1 and a solids content of about 27 to 35%, to be used. The usual impurities mineral variants, and non-hardener adjuvants, if any, may also be present with the silicate. The invention is illustrated by the following Examples.

EXAMPLES 1 TO 10

(Ratio of Hardener Ingredients)

Dimethyl carbonate and diethyl carbonate were mixed together in the ratios by weight (based upon a total of 10 parts) indicated in Table 1 to form hardener mixture compositions, which were then added to aqueous sodium silicate solutions in a quantity of 10%. Composition of the sodium silicate solution: 8.0% $Na_2O$, 26.9% $SiO_2$; 34.9% total solids. The pot lives obtained using these solutions are shown in Table 1 below. The formation of an initial soft gel and a subsequent hard gel was observed in every case. Examples 1–4 are comparative examples in which the amount of dimethyl carbonate is in excess of 60% by weight of the hardener composition. As a result, the pot life is shortened to below the minimum acceptable time of 30 minutes. This clearly demonstrates the criticality of the 60% by weight upper limit of the dimethyl carbonate content or, conversely, the criticality of the 40% by weight lower limit of the diethyl carbonate content.

TABLE 1

Pot lives of sodium silicate solutions using inventive hardener mixtures in a quantity of 10%.

| Example No. | Hardener Mixture Composition (parts by weight) | | Pot Life (mins.) |
|---|---|---|---|
| | dimethyl carbonate | diethyl carbonate | |
| 1* | 10 | — | 10 |
| 2* | 9 | 1 | 13 |
| 3* | 8 | 2 | 19 |
| 4* | 7 | 3 | 26 |
| 5 | 6 | 4 | 30 |
| 6 | 5.5 | 4.5 | 51 |
| 7 | 5 | 5 | 60 |
| 8 | 4 | 6 | 63 |
| 9 | 3 | 7 | 69 |
| 10 | 2 | 8 | 104 |

*comparative example

EXAMPLES 11 TO 13

(Total Quantity of Hardener)

Hardener mixtures according to the invention having the compositions indicated in Table 2 were added to aqueous sodium silicate solutions in the same manner as in Examples 1 to 10 and in such quantity that the total concentration of hardener in the solutions amounted to between 5 and 8% by weight. The pot lives obtained with hardener mixtures such as these are also shown below in Table 2. The pot life of the hardener mixture of Example 8 is repeated for comparison, since the mixture ingredients are present in the same parts by weight ratio as in Example 11. This table clearly demonstrates that the longevity of the pot life decreases with the decrease in the quantity of hardener composition, as might be expected. Extrapolating from a 48 minute pot life with a total quantity of 5% by weight of hardener, a total quantity of less than 4% by weight, even using the most effective ingredient ratio of Example 10, is the minimum quantity that can be expected to yield a pot life of at least 30 minutes, while still effectively hardening the silicate.

TABLE 2

Pot lives of sodium silicate solutions using inventive hardener mixtures in a quantity of from 5 to 10% by weight.

| Example No. | Hardener mixture Composition (parts by weight) | | Total quantity of hardener | Pot Life (mins) |
|---|---|---|---|---|
| | dimethyl carbonate | diethyl carbonate | | |
| 11 | 4 | 6 | 5% | 48 |
| 12 | 4.3 | 5.7 | 7% | 88 |
| 13 | 2.5 | 7.5 | 8% | 88 |
| 8 | 4 | 6 | 10% | 63 |

EXAMPLES 14 TO 18

(Extending Pot Life with Water)

Hardener mixtures were prepared in accordance with Example 5 and added to aqueous sodium silicate solutions together with different quantities of distilled water. The pot lives obtained with mixtures such as these are shown in Table 3 below. The figures for the mixture of Example 5 from Table 1 are included in Table 3 for comparison.

TABLE 3

Pot lives of sodium silicate solutions using hardener mixtures together with distilled water.

| Example No. | Hardener mixtures (parts by weight) | | Quantity of hardener composition (%) | Addition of $H_2O$ (%) | Pot Life (mins) |
|---|---|---|---|---|---|
| | dimethyl carbonate | diethyl carbonate | | | |
| 14 | 6 | 4 | 10 | 10.0 | 63 |
| 15 | 6 | 4 | 9.5 | 4.8 | 45 |
| 16 | 6 | 4 | 9.1 | 9.1 | 63 |
| 17 | 6 | 4 | 8.7 | 13.0 | 49 |
| 18 | 6 | 4 | 8.3 | 16.6 | 55 |
| 5 | 6 | 4 | 10 | — | 30 |

Analysis of Table 3 is most interesting. It will be noted that in all instances, the addition of distilled water extended the pot life beyond the 30 minutes of Example 5. However, the maximum extension was obtained when the amount of distilled water added was about equal to the quantity of hardener (Examples 14 and 16). When the amount of distilled water was considerably less (Example 15) or considerably more (Examples 17, 18), the pot life was not as extended. Thus, depending upon the length of pot life needed in a particular instance, and depending upon the required degree of hardness and compressive strength, about 4 to 20% by weight of water may be added, a quantity about equal to the amount of hardener composition being preferred. While distilled water was used in the examples, any water may be used, provided that it does not contain appreciable amounts of ions such as carbonate, that may interfere with the inventive compositions.

EXAMPLE 19

(Determination of Compressive Strength)

(a) Production of the test specimens 4.2 parts by weight of gravel (particle size 6 mm) were mixed for 2 minutes in a 50 Hobart mixer with 1 part by weight of the silicate/hardener mixture. Quantities of 250-270 g of the resulting mixture were weighed into a plastic tube and compressed by hand to form cylindrical test specimens (h=60 mm, φ=50 mm). After the gelation time, the test specimens were horizontally stored for 1.5 h at room temperature to harden, removed from the plastic tube and hermetically sealed in a polyethylene tub. Some of the test specimens were tested for compressive strength after storage for 7 days at room temperature in the hermetically sealed polyethylene tub. The remaining test specimens were stored for 6 days in distilled water at room temperature and then tested for compressive strength. Compressive strength was determined using a G. Fischer compressive strength tester.

In Table 4 below, the compressive strengths of the test specimens thus produced and treated are compared with the compressive strength of test specimens produced and treated in the same way with conventional hardeners. (Higher numbers are desirable).

TABLE 4

Compressive strength of test specimens (average values from 6 tests).

| Hardener according to: | Compressive strength [N/cc] after storage for: | |
|---|---|---|
|  | 7 days in polyethylene tube | 6 days in distilled water |
| Rhone Poulenc Co. hardener: "Durcisseur" (trademark) | 230 | 35.6 |
| U.S. Pat. No. 4,293,340 (without CaCl$_2$) | 19 | collapsed |
| U.S. Pat. No. 4,293,340 (with CaCl$_2$) | 16 | 15 |
| Present invention, Examples |  |  |
| 5 | 457.5 | 98 |
| 7 | 285 | — |
| 8 | 305 | — |
| 9 | 280 | — |
| 10 | 285 | — |
| 15 | 450 | 275 |

Evaluating the data of Table 4, it will be seen that all representative examples according to this invention are superior to the prior art tested. Even Example 5 of the present invention, which has a minimally acceptable pot life of 30 minutes, produced a stabilizing effect (extrapolated from the compressive strength data) that is superior to the comparative examples using prior art hardeners. Moreover, where a maximum pot life of 104 minutes is achieved (Example 10 of this invention), the compressive strength data is still much better than that of the prior art. The continued superior compressive strength even after storage in distilled water (which might be expected to leach some hardened silicate components) further demonstrates the superior utility of the present invention. It may further be noted that the compressive strength is at its highest when the quantity of dimethyl carbonate is at its maximum. Thus, where maximum compressive strength and maximum pot life are both important, a formulation with added water (such as in Example 15) may be optimum.

EXAMPLE 20

(Determination of the Chemical Oxygen Demand (COD) value

Test specimens produced in the same way as described in Example 19 were stored for 7 days in a hermetically sealed 1 liter polyethylene tub and then placed on a perforated VA-steel pedestal (length=50 mm, height=20 mm). 900 ml of distilled water were then added, the polyethylene tub was closed and the water stirred by means of a magnetic stirrer.

The COD values were determined after 1, 4 and 8 hours and after 1, 3 and 6 days.

COD values of the test specimens hardened with the compositions according to the invention were compared with those of test specimens which had been hardened with conventional compositions. The measured values are shown below in Table 5.

TABLE 5

(COD evaluation) COD of the eluates of test specimens (average values from 6 tests).

| Hardener according to: | COD value [mg of O$_2$/l] after: | | | | | |
|---|---|---|---|---|---|---|
|  | 1 h | 4 h | 8 h | 1 d | 3 d | 6 d |
| Rhone Poulenc Co., hardener: "Durcisseur" (trademark) | 1434 | 2405 | 3161 | 5096 | 7305 | 839 |
| U.S. Pat. No. 4,293,340 (without CaCl$_2$) | 122 | 210 | 287 | 503 | 678 | 660 |
| U.S. Pat. No. 4,293,340 (with CaCl$_2$) | 75 | 143 | 192 | 342 | 443 | 65 |
| Present invention Example No. |  |  |  |  |  |  |
| 5 | 342 | 723 | 1008 | 1350 | 1681 | 192 |
| 7 | 639 | 1380 | 1615 | 2703 | 3583 | 297 |
| 8 | 526 | 1238 | 1460 | 2473 | 3570 | 275 |
| 9 | 611 | 1546 | 1668 | 2892 | 3753 | 284 |
| 10 | 562 | 1440 | 1726 | 3038 | 4066 | 270 |
| 15 | 507 | 1066 | 1512 | 2560 | 3595 | 301 |

For the specimens stored 6 days, the original water was discarded after 3 days and replaced by 900 ml of fresh distilled water. Therefore, the 6 day figures may be adjusted (for comparison with shorter times) by adding to them the respective 3 day figures.

A lower COD value is more desirable, and it will be noted that all tested values for the present invention were superior to those using the DURCISSEUR hardener. While the values using hardeners according to U.S. Pat. No. 4,293,340 are still lower, it should be noted that such hardeners show markedly inferior compressive strength (see Table 4) and therefore are not useful for the purposes of the present invention.

Methods of Use

The hardened alkali metal silicates of this invention are useful in the stabilization of small solid particles such as soil. The delay in hardening of at least 30 minutes after mixing, permits more thorough penetration and greatly facilitates on-site handling. The hardened silicates are particularly useful for stabilizing ground soil in the construction of underground railways and other tunnels, mines, excavations, earthworks, embankments, and the like, and for stabilizing small particle waste heaps, sludge, dumps, etc.

The mixture of aqueous alkali metal silicate solution and hardener composition may be applied to the soil, while still liquid, in any known manner including, but not limited to, injection, and gravity penetration when the soil is sufficiently porous. The longer delayed gelling (hardening) time that is afforded by some embodiments of this invention (viz. Example 10) may permit utilization in ways not previously contemplated, that would be obvious to one skilled in the art, given this disclosure. The hardened silicate compositions may be useful as binders, and may permit the fabrication of useful construction materials when the soil or other small solid particles are properly chosen. When used to treat small particle wastes (which may be dry or a sludge), the resulting hardened product may remain in place (i.e. self-capped), may be cut into transportable sizes and removed, or may initially be formed into bricks or blocks which may then be disposed of or used for construction.

Summarizing the method of utilization, which is generally known except for the use of the inventive compositions, the aqueous alkali metal silicate solution is first mixed with the hardener compositions of this invention, together with any desired adjuvants or auxiliary ingredients. The mixture is then used to impregnate the soil to be treated, while it is still in liquid form. The impregnated soil is then permitted to remain (preferably substantially undisturbed) until the silicate mixture has turned into a hard gel. As discussed above, the silicate mixture first goes through an intermediate soft gel stage, and generally should not be disturbed from this point onward. The time during which the silicate mixture impregnated soil should remain undisturbed is, of course, measured from the point at which the hardener composition is admixed with the silicate solution, and not from the point of application. By very simple calculation, one can estimate the total time required for mixing and soil impregnation, and then select a hardener composition with a dimethyl carbonate to diethyl carbonate ratio and total hardener amount (optionally with added water) whose hardening time is suitable.

We claim:

1. A hardener composition for an aqueous alkali metal silicate solution consisting essentially of
   about 20 to 60% by weight of dimethyl carbonate, and
   the balance to 100% by weight of diethyl carbonate.

2. A soil stabilizer formulation comprising:
   an aqueous alkali metal silicate solution; and
   a hardener composition consisting essentially of about 20 to 60% by weight of dimethyl carbonate and the balance to 100% by weight of diethyl carbonate, said hardener composition being present in about 4 to 11% by weight based on the total weight of the formulation.

3. The soil stabilizer formulation of claim 2 with the addition of water in a further amount of about 4 to 20% by weight to the total weight of the formulation.

4. The soil stabilizer formulation of claim 3 wherein the amount of water is about equal in percent by weight to the amount of hardener composition.

5. The soil stabilizer formulation of claim 2 with the addition of at least one oxidizing agent in a weight ratio of hardener to oxidizing agent of about 0.3-3:1.

6. The soil stabilizer formulation of claim 5 wherein said oxidizing agent is sodium hypochlorite, hydrogen peroxide, potassium perborate or potassium percarbonate.

7. The soil stabilizer formulation of claim 3 with the addition of at least one oxidizing agent in a weight ratio of hardener to oxidizing agent of about 0.3-3:1.

8. The soil stabilizer formulation of claim 7 wherein said oxidizing agent is sodium hypochlorite, hydrogen peroxide, potassium perborate or potassium percarbonate.

9. A method of stabilizing soil or solid particle waste, comprising
   mixing together an aqueous alkali metal silicate solution with about 4 to 11% by weight, based upon the total weight of the formulation, of a hardener composition consisting essentially of about 20 to 60% by weight of dimethyl carbonate and the balance to 100% by weight of diethyl carbonate;
   impregnating said soil or waste with a stabilizing amount of said mixture, while said mixture is still liquid; and
   permitting said impregnated soil or waste to remain substantially undisturbed for at least 30 minutes measured from the moment of said mixing, until said impregnated mixture has hardened.

10. The method of claim 9 wherein water in a further amount of about 4 to 20% by weight in addition to the total weight of the formulation is admixed at the same time as the hardener composition.

11. The method of claim 10 wherein the amount of admixed water is about equal in percent by weight to the amount of hardener composition.

12. The method of claim 9 wherein at least one oxidizing agent in a weight ratio of about 0.3-3:1 based upon the weight of the hardener composition is admixed at the same time as the hardener composition.

13. The method of claim 12 wherein said oxidizing agent is sodium hypochlorite, hydrogen peroxide, potassium perborate, or potassium percarbonate.

14. The method of claim 10 wherein at least one oxidizing agent in a weight ratio of about 0.3-3:1 based upon the weight of the hardener composition is admixed at the same time as the hardener composition.

15. The method of claim 11 wherein said oxidizing agent is sodium hypochlorite, hydrogen peroxide, potassium perborate, or potassium percarbonate.

16. The method of claim 9 wherein soil forming the ground in a tunnel, mine, excavation, earthwork, or embankment is stabilized, and impregnation is by means of injection of the stabilizer formulation into said ground soil.

* * * * *